United States Patent
Bezzera

(10) Patent No.: US 10,537,206 B2
(45) Date of Patent: Jan. 21, 2020

(54) MACHINE FOR COFFEE-BASED BEVERAGES

(71) Applicant: G. BEZZERA DI BEZZERA GUIDO, Rosate (Milan) (IT)

(72) Inventor: Luca Bezzera, Buccinasco (IT)

(73) Assignee: G. Bezzera S.R.L., Rosate (IT)

( * ) Notice: Subject to any disclaimer, the term of this patent is extended or adjusted under 35 U.S.C. 154(b) by 973 days.

(21) Appl. No.: 15/017,202

(22) Filed: Feb. 5, 2016

(65) Prior Publication Data
US 2016/0235244 A1    Aug. 18, 2016

(30) Foreign Application Priority Data
Feb. 13, 2015 (IT) .............. MI2015A0204

(51) Int. Cl.
A47J 31/52    (2006.01)
A47J 31/36    (2006.01)

(52) U.S. Cl.
CPC .............. *A47J 31/52* (2013.01); *A47J 31/36* (2013.01)

(58) Field of Classification Search
CPC .................................. A47J 31/36; A47J 31/52
USPC ......... 99/283, 281, 288, 285, 286, 290, 279, 99/280, 282, 289 R, 291, 293, 297, 299, 99/302 R, 302 P, 275; 222/146.1, 145, 222/146.6, 640, 129.1, 129.2, 129.3, 222/129.4
See application file for complete search history.

(56) References Cited

U.S. PATENT DOCUMENTS

| | | | |
|---|---|---|---|
| 8,656,826 B2 | 2/2014 | Bianchi et al. | |
| 8,850,956 B2 | 10/2014 | Bianchi et al. | |
| 8,850,959 B2 | 10/2014 | Bianchi et al. | |
| 2009/0013875 A1* | 1/2009 | Widanagamage Don | A47J 31/36 99/280 |
| 2011/0094390 A1 | 4/2011 | Bianchi et al. | |
| 2011/0094392 A1 | 4/2011 | Bianchi et al. | |
| 2011/0097454 A1* | 4/2011 | Coccia | A47J 31/36 426/231 |
| 2012/0269944 A1 | 10/2012 | Bianchi et al. | |

(Continued)

FOREIGN PATENT DOCUMENTS

| | | |
|---|---|---|
| EP | 2314183 A1 | 4/2011 |
| EP | 2490580 A2 | 8/2012 |

(Continued)

*Primary Examiner* — Dana Ross
*Assistant Examiner* — Ket D Dang
(74) *Attorney, Agent, or Firm* — Pearne & Gordon LLP

(57) ABSTRACT

It is disclosed a machine for coffee-based beverages. The machine comprises a hydraulic pump, a hydraulic circuit, a volume flowmeter and a processing unit. The processing unit receives a pressure dispensing profile signal indicating the trend of a configured pressure of a pressurized water during the dispensing cycle. The dispensing profile signal comprises a first volumetric portion having a first pressure trend in a first volumetric interval and comprises a second volumetric portion having a second pressure trend in a second volumetric interval. The processing unit generates a configuration signal as a function of the first and second pressure trend so as to drive the hydraulic pump, receives the volume measurement signal indicating the measure of the volume of the water at the end of the second volumetric interval and checks whether it is equal to the volume of a dose.

11 Claims, 8 Drawing Sheets

(56) References Cited

U.S. PATENT DOCUMENTS

| | | | |
|---|---|---|---|
| 2013/0344205 A1* | 12/2013 | Oh | B65D 85/8043 426/232 |
| 2014/0242226 A1 | 8/2014 | Buttiker | |
| 2014/0261853 A1* | 9/2014 | Carnevale | A47J 31/061 141/1 |
| 2015/0064323 A1* | 3/2015 | Prefontaine | A47J 31/46 426/433 |
| 2015/0216355 A1 | 8/2015 | Duvall | |

FOREIGN PATENT DOCUMENTS

| | | |
|---|---|---|
| WO | 2014028844 A1 | 2/2014 |
| WO | 2014177925 A1 | 11/2014 |

* cited by examiner

MACHINE FOR COFFEE-BASED BEVERAGES

BACKGROUND

Technical Field

The present disclosure generally relates to the field of coffee machines.

More specifically, the present disclosure concerns a machine for coffee-based beverages that is equipped with automatic control of the variable pressure of the water dispensed during a dispensing cycle for dispensing a dose of coffee.

Description of the Related Art

It is known that the quality of coffee is influenced by the pressure value of the water and by the temperature of the hot water.

Patent EP 2490580 discloses a coffee machine equipped with a system for adjusting the pressure and temperature of the water; adjustment of the pressure is achieved by varying the speed of a variable speed motor pump.

Patent EP 2490580 further discloses a second operating mode wherein the user can select a pressure profile out of a plurality of predefined pressure profiles: in this second mode the control unit internal to the coffee machine automatically adjusts the speed of the pump (and thus the water pressure) when the coffee is being dispensed, so as to reproduce the trend of the selected pressure profile.

The Applicant has observed that one drawback of patent EP 2490580 is that the automatic adjustment of the water pressure is a function of the dispensing time (see FIG. 4), which is typically comprised between 25 and 30 seconds to dispense a dose of espresso coffee.

Depending on the coffee grind size and other factors, this type of control can lead to the dispensing of a dose of under-extracted espresso coffee (that is, in which only part of the substances contained in the coffee powder have been extracted) or a dose of over-extracted coffee (that is, in which the passage of water through the coffee powder has taken place for an excessively long length of time, thus creating an unpleasant burnt taste).

Patent EP 2314183 discloses a coffee machine equipped with automatic water pressure control as a function of the dispensing time for dispensing a dose of espresso coffee (see FIGS. 5a-5c), typically equal to 25 seconds.

Patent EP 2314183 is based on the assumption (see paragraph 22) that the dispensing time for dispensing a dose of espresso coffee should not deviate too far from the nominal value of 25 seconds (e.g. no more than 3 seconds, preferably no more than 1 second): otherwise, the water is encountering anomalous resistance in its passage through the blend of coffee (that is, the blend of coffee is too fine or too coarse), with the result that the quality of the espresso coffee is not good.

In particular, the current pressure of the water is measured by a pressure sensor 21 and then the value measured is read by a control unit 22, which adjusts the flow of water as a function of the measured pressure value, thereby adjusting the pressure of the water during the dispensing of the coffee: in this way the dispensing time for dispensing a dose of espresso coffee should not deviate by more than 1 second from the nominal dispensing time of 25 seconds, so as to ensure good quality of the espresso coffee.

The Applicant has observed that one drawback of patent EP 2314183 is that automatic adjustment of the water pressure is carried out in order to prevent excessive deviation from the nominal dispensing time of 25 seconds for a dose of espresso coffee; again, this too can lead to the dispensing of a dose of under-extracted or over-extracted coffee.

The Applicant has also observed that the currently known espresso coffee machines do not allow types of coffee other than espresso coffee to be obtained, including for example an American filter coffee.

BRIEF SUMMARY

The present disclosure concerns a machine for coffee-based beverages as defined in the appended independent claims and by the preferred embodiments thereof described in the dependent claims.

The Applicant has perceived that the quality of the dispensed espresso coffee can be improved (that is, the probability of obtaining a dose of under-extracted or over-extracted coffee can be reduced) by means of automatic control of the variable pressure of the water dispensed as a function of the measure of the volume of water dispensed during a dispensing cycle for dispensing a dose of espresso coffee: in this way the dispensing time for a dose of espresso coffee can also differ significantly from the nominal dispensing time.

Moreover, the machine for coffee-based beverages according to the disclosure allows to obtain not only espresso coffee of good quality, but also other types of coffee-based beverages, such as for example an American filter coffee, using a single dispensing group.

One embodiment of the present disclosure is a system as defined in the enclosed independent claim and by the preferred embodiments thereof disclosed in the dependent claim.

DETAILED DESCRIPTION

Note that in the description below, identical or similar blocks, components or modules are indicated by the same numerical references in the figures.

Figure 1:
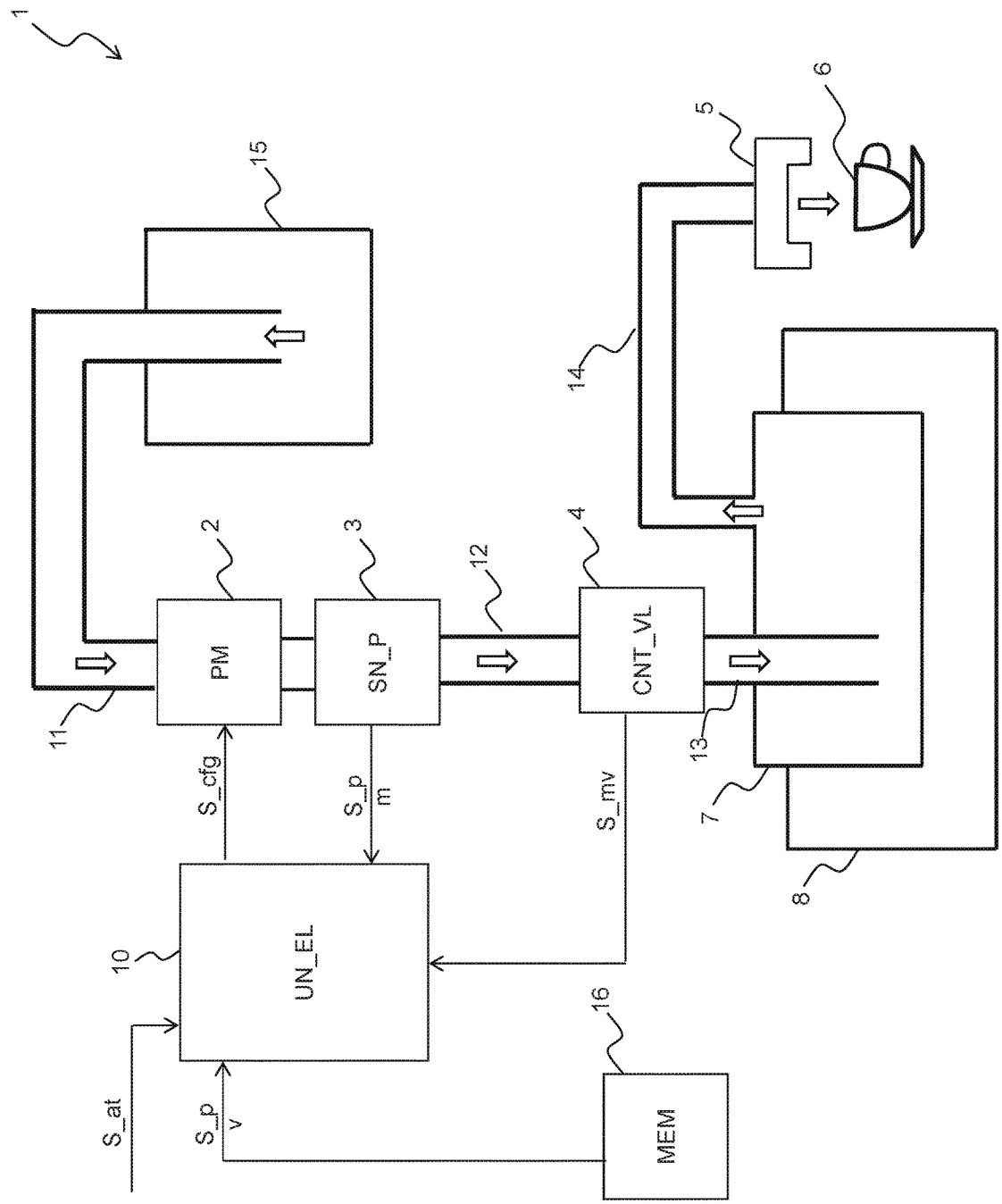
FIG. 1 shows a block diagram of a machine for coffee-based beverages according to a first embodiment of the disclosure.

With reference to FIG. 1, a block diagram of a machine 1 for coffee-based beverages is shown according to a first embodiment of the disclosure.

The machine 1 for coffee-based beverages comprises:
a suction line 11;
a hydraulic pump 2;
a variable speed electric motor (not shown in FIG. 1);
a water pressure sensor 3;
a connection line 12;
a volume flowmeter 4;
a delivery line 13;
a heat exchanger 7;
a boiler 8;
a dispensing line 14;
a dispensing unit 5;
a processing unit 10;
a memory 16.

The machine 1 for coffee-based beverages comprises a container 15 for cold water; alternatively, the machine 1 for coffee-based beverages is connected to the water supply system.

The set of the connection line 12, of the delivery line 13 and of the dispensing line 14 form a hydraulic circuit which transports water from the hydraulic pump 2 to the dispensing unit 5.

The suction line 11 comprises an inlet for receiving cold water from the container 15 and it is adapted to transport cold water from the container 15 to the outlet of the suction line 11.

The hydraulic pump 2 comprises an inlet, connected to the outlet of the suction line 11, for receiving the cold water and it comprises an outlet adapted to generate pressurized water, that is water having a higher pressure P compared to the pressure of the incoming water.

The term "pressurized" water is understood as having a pressure value comprised between 0 bars (excluded) and 12 bars (included).

Therefore the hydraulic pump 2 has the function of increasing the pressure of the exiting water, with respect to the pressure of the incoming water.

The hydraulic pump 2 is for example a displacement type of pump.

The electric motor is connected to the hydraulic pump 2 and has the function of driving the hydraulic pump 2, by means of the change of the rotational speed of the electric motor.

The rotational speed of the electric motor is variable as a function of the value of a configuration signal S_cfg, which is proportional to the value of a dispensing profile signal S_pv indicating the configured pressure of the pressurized water dispensed during a dispensing cycle for dispensing a dose of a coffee-based beverage, as a function of the volume of the water dispensed during the dispensing cycle for dispensing the dose of the coffee-based beverage.

The term "configured pressure" referring to the pressurized water is understood as the value of the pressure of the pressurized water dispensed during a dispensing cycle for dispensing a dose of a coffee-based beverage for a given value of the volume of the pressurized water, in particular the value of the water pressure that the hydraulic pump 2 must generate at its outlet.

Therefore the pressure value of the water exiting the hydraulic pump 2 is a function of the rotational speed of the electric motor.

The configuration signal S_cfg can be for example a voltage signal: in this case the voltage value adjusts the supply voltage of the electric motor and thus adjusts the rotational speed of the electric motor, which, in turn, drives the hydraulic pump 2 and thus adjusts the pressure of the water exiting the hydraulic pump 2.

The machine 1 for coffee-based beverages comprises a memory 16 configured to store a table that associates a plurality of values of the dispensing profile signal S_pv with a respective plurality of values of the voltage of the configuration signal S_cfg.

For the purposes of explaining the disclosure, for the sake of simplicity it is assumed that the hydraulic pump 2 and the electric motor are integrated within a single component 2, which thus comprises an electrical input terminal to receive the configuration signal S_cfg, as shown in FIG. 1.

The water pressure sensor 3 has the function of measuring the pressure value of the water dispensed during a dispensing cycle for dispensing a dose of a coffee-based beverage.

In particular, the water pressure sensor 3 comprises an inlet connected to the outlet of the hydraulic pump 2 for receiving the pressurized cold water, comprises an outlet adapted to generate cold water at a pressure value substantially equal to the pressure at the inlet, and comprises an electrical output terminal adapted to generate a pressure measurement signal S_pm indicating the measure of the pressure of the water exiting the hydraulic pump 2.

The pressure sensor 3 is for example a transducer that generates the pressure measurement signal S_pm, which is a voltage signal of a value proportional to the value of the measured pressure of the water exiting the hydraulic pump 2.

For the purposes of explaining the disclosure, it is considered that the pressure of the water is measured at the outlet of the hydraulic pump 2, but the pressure of the water can also be measured at other points along the hydraulic circuit, such as for example at the output of the volume flowmeter 4 or at the inlet of the dispensing unit 5.

For example, the pressure of the water can be measured at the input of the dispensing unit 5; in this case, the pressure sensor 3 is positioned on the dispensing line 14, that is the pressure sensor 3 comprises an inlet connected to the outlet of the dispensing line 14 and an outlet connected to the dispensing unit 5.

The connection line 12 comprises an inlet, connected to the outlet of the water pressure sensor 3, for receiving the pressurized cold water and it is adapted to transport the pressurized cold water from the inlet thereof to an outlet thereof.

The volume flowmeter 4 has the function of measuring the volume of the water dispensed during a dispensing cycle for dispensing a dose of a coffee-based beverage.

In particular, the volume flowmeter 4 comprises an inlet connected to the outlet of the connection line 12 for receiving the pressurized cold water, an outlet for generating cold water at a pressure value substantially equal to the pressure at the inlet and an electrical output terminal for generating a volume measurement signal S_mv indicating the measure of the volume of the water dispensed during a dispensing cycle for dispensing a dose of a coffee-based beverage.

For example, the volume measurement signal S_mv can be a voltage signal having values proportional to the values of the measure of the volume of dispensed water.

For the purposes of explaining the disclosure, it is considered that the volume of the water dispensed for a dose of a coffee-based beverage is the one measured on the connection line 12, but the volume of the water dispensed can also be measured at other points along the hydraulic circuit.

For example, the volume of the water dispensed can be measured at the inlet of the dispensing unit 5; in this case the volume flowmeter 4 is positioned on the dispensing line 14, that is the volume flowmeter 4 comprises an inlet connected to the outlet of the dispensing line 14 and it comprises an outlet connected to the dispensing unit 5.

In the case wherein the pressure sensor 3 and the volume flowmeter 4 are both positioned on the dispensing line 14, the pressure sensor 3 comprises an inlet connected to the outlet of the dispensing line 14 and an outlet connected to the inlet of the volume flowmeter 4 and furthermore the volume flowmeter 4 comprises an outlet connected to the dispensing unit 5.

The delivery line 13 comprises an inlet, connected to the outlet of the volume flowmeter 4, for receiving the pressurized cold water and it is adapted to transport the pressurized cold water from the inlet thereof to an outlet thereof.

The delivery line 13 is immersed (at least partially) inside the heat exchanger 7.

The heat exchanger 7 is positioned inside the boiler 8 and it comprises an inlet for receiving at least part of the delivery line 13 and comprises an outlet for generating pressurized hot water.

The boiler 8 has the function of producing steam and hot water.

The dispensing line 14 comprises an inlet, connected to the outlet of the heat exchanger 7, for receiving the pressurized hot water and it is adapted to transport the pressurized hot water from the inlet thereof to an outlet thereof.

In particular, a three-way solenoid valve (indicated in the following with "group solenoid valve") is positioned along the dispensing line 14, having the function to open and close the water flow towards the dispensing unit 5 using the first and second way and furthermore having the function of discharging the excess water using the third way.

The dispensing unit 5 comprises a filter for containing the blend of coffee, an inlet, connected to the outlet of the dispensing line 14, for receiving the pressurized hot water, and an outlet for dispensing the coffee obtained by means of the passage of pressurized hot water through the blend of coffee.

The processing unit 10 has the function of controlling the value of the variable pressure of the water dispensed during a dispensing cycle for dispensing a dose of a coffee-based beverage, as a function of the current value of the measure of the volume of dispensed water, as it will be explained in greater detail below with reference to FIGS. 2A-2C and 3A-3B.

The processing unit 10 comprises:
a first electrical input terminal adapted to receive an activation signal S_at indicating the start of a dispensing cycle for dispensing a dose of a coffee-based beverage;
a second electrical input terminal adapted to receive the pressure measurement signal S_pm indicating the measure of the pressure of the water dispensed during a dispensing cycle for dispensing a dose of a coffee-based beverage;
a third electrical input terminal adapted to receive the volume measurement signal S_mv indicating the measure of the volume of the water dispensed during a dispensing cycle for dispensing a dose of a coffee-based beverage;
a fourth electrical input terminal adapted to receive the pressure dispensing profile signal S_pv (see FIG. 2) indicating the trend of the configured pressure of the pressurized water dispensed during a dispensing cycle for dispensing a dose of a coffee-based beverage, as a function of the volume of the water dispensed during the dispensing cycle for dispensing the dose of the coffee-based beverage;
an electrical output terminal adapted to generate, as a function of the values of the trend of the pressure dispensing profile signal S_pv, the configuration signal S_cfg having values proportional to the value of the pressure dispensing profile signal S_pv indicating the configured pressure of the water, that is indicating the value of the pressure of the pressurized cold water that the hydraulic pump 2 must generate at the outlet thereof for a given value of the volume of the pressurized cold water measured by the volume flowmeter 4.

The memory 16 is configured to store one or more pressure dispensing profile signals S_pv.

Figure 2A:
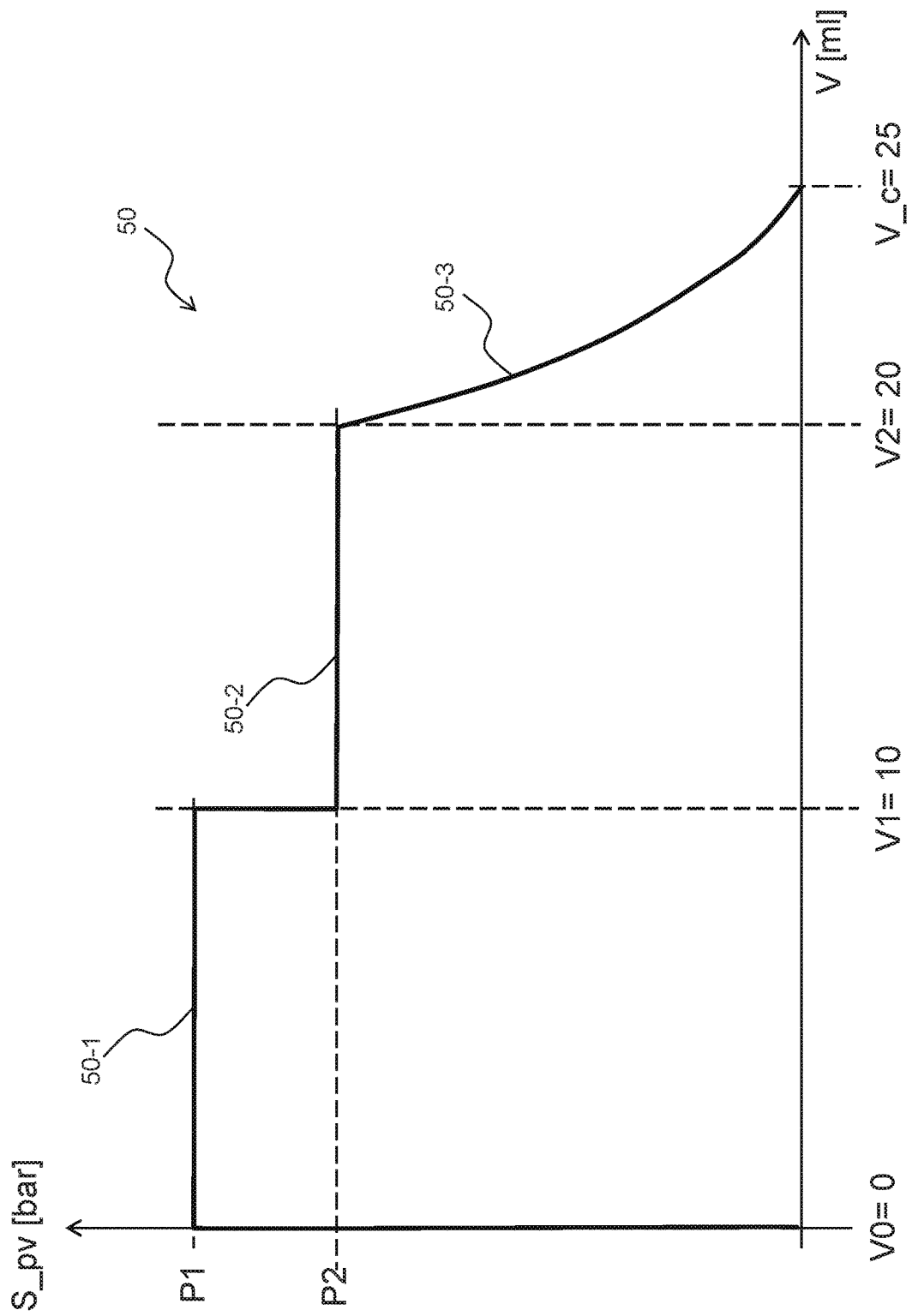
FIGS. 2A-2B schematically show two possible trends of the variable water pressure as a function of the volume of water dispensed during a dispensing cycle for dispensing a dose of espresso coffee according to the disclosure.

With reference to FIG. 2A, it shows in a cartesian plane a first possible trend 50 of the pressure dispensing profile signal S_pv indicating the trend of the configured pressure of the water dispensed during a dispensing cycle for dispensing a dose of espresso coffee, as a function of the volume of the water dispensed during the same dispensing cycle for dispensing the dose of espresso coffee.

In particular, FIG. 2A shows that the configured pressure is variable as a function of the volume of the water dispensed during the dispensing cycle for dispensing the dose of espresso coffee (for example, the volume is measured on the pressurized cold water passing through the volume flowmeter 4).

It is assumed to measure the volume of the water dispensed in millilitres (abbreviated herein below as ml, wherein a millilitre=$^1/_{1000}$ of a litre) and the pressure of the water in bars.

It is assumed that the volume of the water dispensed in a dispensing cycle for dispensing a dose of espresso coffee is equal to V_c (indicated herein below as "volume of a dose"), which is typically equal to 25 ml for espresso coffee.

Therefore the values on the x-axis are expressed in ml and those on the y-axis are expressed in bars.

The machine 1 for coffee-based beverages is thus adapted to make a cup of espresso coffee by means of an artificial percolation process which consists in the slow movement of hot water through the coffee powder (that is, through the ground coffee) contained in the filter of the dispensing unit 5, wherein said movement of the water is achieved by means of the hydraulic pump 2.

The artificial percolation process for a dose of espresso coffee can be subdivided into three phases:
a first "spraying phase", wherein the coffee powder is wet with a stream of hot water at high pressure for a short time interval (less than or equal to 1.5 seconds), in order to eliminate residual air present in the hydraulic circuit and facilitating the second extraction phase;
a second "extraction phase" subsequent to the "spraying phase" and comprised between the null volumetric value and the volumetric value V2, wherein the hot water at high pressure passes through the wet coffee powder so as to extract the lipo-soluble substances contained in the coffee powder;
a third "emulsifying phase" subsequent to the extraction phase and comprised between the volumetric value=V2 and the volume V_c=25 ml of the dose of espresso coffee, wherein the extracted substances stabilize creating a layer of foam on the surface of the espresso coffee.

It is possible to observe the following trend in FIG. 2A:
the extraction phase is subdivided into two volumetric portions 50-1, 50-2, within which the trend of the pressure dispensing profile signal 50 is substantially constant, so as to uniformly extract the lipo-soluble substances contained in the coffee powder;

in the emulsifying phase the portion 50-3 of the pressure dispensing profile signal 50 has a gradually decreasing trend so as to allow stabilize the extracted substances, in particular gradually decreasing from a pressure value P2 assuming when the volumetric value is equal to V2 to the null pressure value assuming when the volumetric value is equal to the volume V_c=25 ml of a dose of espresso coffee.

In particular, the volumetric portion 50-1 is comprised between the volumetric value V0=0 ml and the volumetric value V1=10 ml, wherein the pressure dispensing profile signal 50 has a substantially constant trend equal to a pressure value P1;

the volumetric portion 50-2 is comprised between the volumetric value V1=10 ml and the volumetric value V2=20 ml, wherein the pressure dispensing profile signal 50 has a substantially constant trend equal to the pressure value P2 lower than P1.

For example, P1=8 bars and P2=7 bars.

Note that for the sake of simplicity in FIG. 2A, it is considered the case wherein the pressure dispensing profile signal 50 has a step transition from the value P1 to the value P2 of the water pressure when the quantity of the volume of water dispensed is equal to V1, but more generally it is possible to obtain a more gradual transition from the value P1 to P2; in other words, the pressure dispensing profile signal 50 reaches the value P2 when the quantity of the volume of the water dispensed is greater than V1 by a sufficiently low value.

In the case of an espresso coffee the maximum value P1 of the pressure dispensing profile signal 50 (that is, the maximum value of the configured pressure) is for example equal to 9 bars.

The subdivision of the extraction phase of the pressure dispensing profile signal 50 into two volumetric portions 50-1, 50-2 within which the trend of the water pressure is substantially constant is particularly advantageous because it allows to improve the quality of the espresso coffee, that is to reduce or eliminate the cases wherein under-extracted or over-extracted coffee is obtained.

Moreover, the subdivision of the pressure dispensing profile signal into two or more volumetric portions within which the trend of the water pressure is substantially constant allows to obtain coffee-based beverages different than espresso coffee.

Figure 2B:
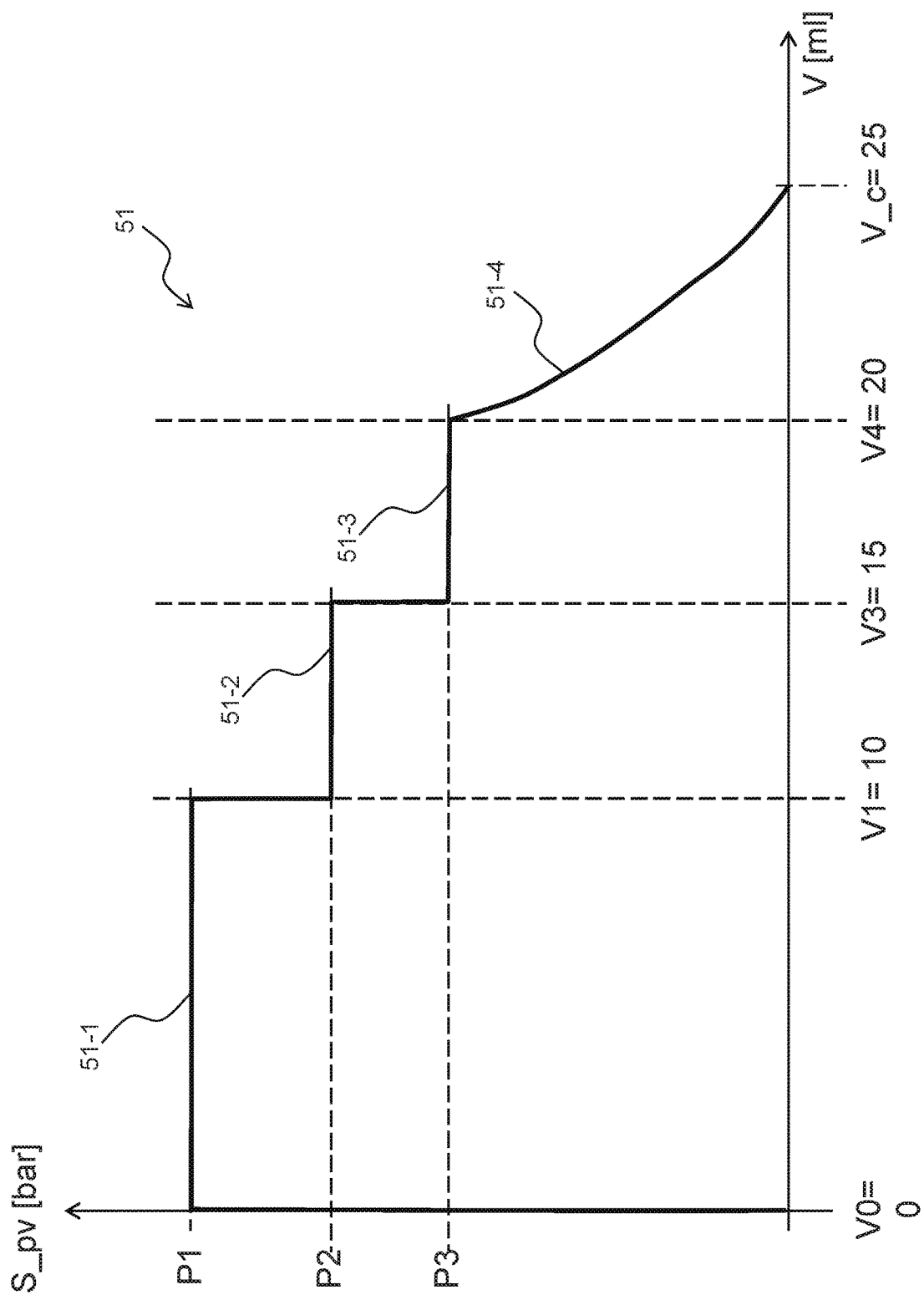

With reference to FIG. 2B, it shows a second possible trend of the pressure dispensing profile signal 51 indicating the trend of the configured pressure of the water dispensed during a dispensing cycle for dispensing a dose of espresso coffee, as a function of the volume of the water dispensed during the same dispensing cycle for dispensing the dose of espresso coffee.

The second trend 51 of the pressure dispensing profile signal S_pv in FIG. 2B differs from the first trend 50 of the pressure dispensing profile signal S_pv in FIG. 2A in that the extraction phase is subdivided into three volumetric portions 51-1, 51-2, 51-3.

It can be observed that in this case as well, the second trend 51 of the pressure dispensing profile signal S_pv is substantially constant within each volumetric portion 51-1, 51-2, 51-3, whereas the values V3, V4 that define the extension of the volumetric portions change and the values of the pressures within each volumetric portion change, while the volume V_c of the dose of espresso coffee is the same.

Therefore the previous considerations regarding the first trend 50 of the pressure dispensing profile signal S_pv are applicable in a similar manner to the second trend 51 of the pressure dispensing profile signal S_pv.

In one embodiment, the machine 1 for coffee-based beverages according to the disclosure allows to obtain an American filter coffee of good quality, using a single dispensing group.

In other words, a single dispensing group is used for obtaining both an espresso type of coffee and an American filter coffee.

It is known that American filter coffee is obtained by means of an infusion process, that is by means of the passage of water on the ground coffee at a null pressure value.

The machine 1 coffee-based beverages allows to reproduce said infusion process, by setting a suitable value of the nominal pressure of the water slightly greater than zero (e.g. equal to 0.5 bar), wherein said suitable value is kept substantially constant until the quantity of the volume of a dose of American filter coffee has been dispensed, said quantity typically being comprised between 100 and 200 ml.

Figure 2C:
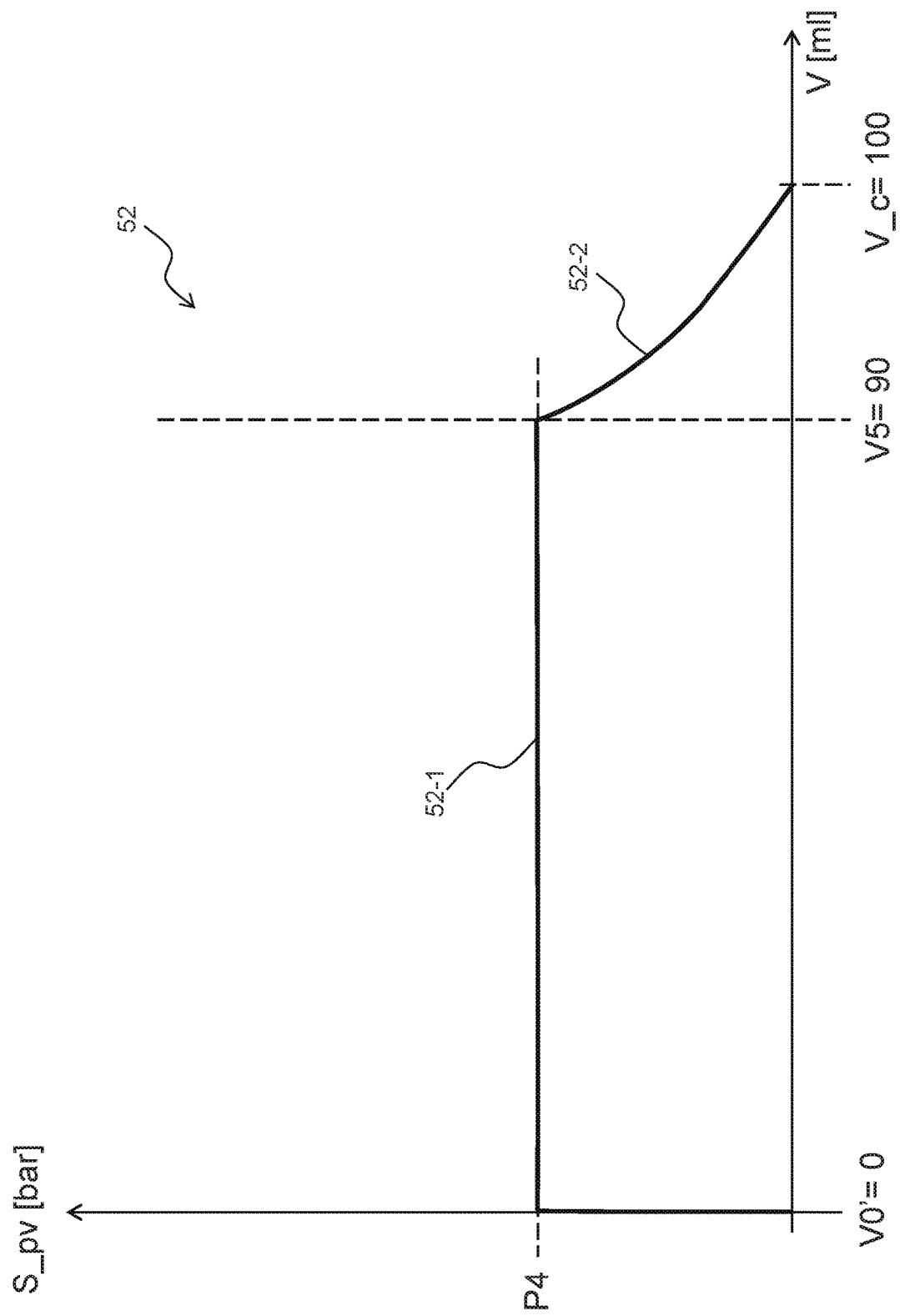
FIG. 2C schematically shows an additional possible trend of the variable water pressure as a function of the volume of water dispensed during a dispensing cycle for dispensing a dose of American filter coffee according to the disclosure.

With reference to FIG. 2C, it shows a third possible trend 52 of the pressure dispensing profile signal S_pv indicating the trend of the configured pressure of the water dispensed during a dispensing cycle for dispensing a dose of American filter coffee, as a function of the volume of the water dispensed during the same dispensing cycle for dispensing the dose of American filter coffee.

The third trend 52 of the pressure dispensing profile signal S_pv in FIG. 2C differs from the first and the second trend 50, 51 of the pressure dispensing profile signal S_pv in FIGS. 2A-2B in that it is presented a volumetric portion 52-1 comprised between the volumetric value V0'=0 and the volumetric value V5 (equal for example to 90 ml), wherein the trend 52 of the volumetric portion 52-1 is substantially constant and equal to P4, which is a sufficiently low value; for example, the value of P4 is comprised between 0.3 bars and 0.7 bars or, alternatively, is comprised between 3 bar (included) and 5 bar (excluded).

The presence of the volumetric portion 52-1 with a substantially constant pressure trend and a sufficiently low value has the function of reproducing the infusion phase and thus it allows to obtain the American filter coffee.

Note that FIGS. 2A, 2B and 2C show that value of the pressure dispensing profile signal within the volumetric portions 50-1, 50-2, 51-1, 51-2, 51-3 is substantially constant, but more generally the trend of one or more of said volumetric portions can differ from the constant trend.

Figure 3A:
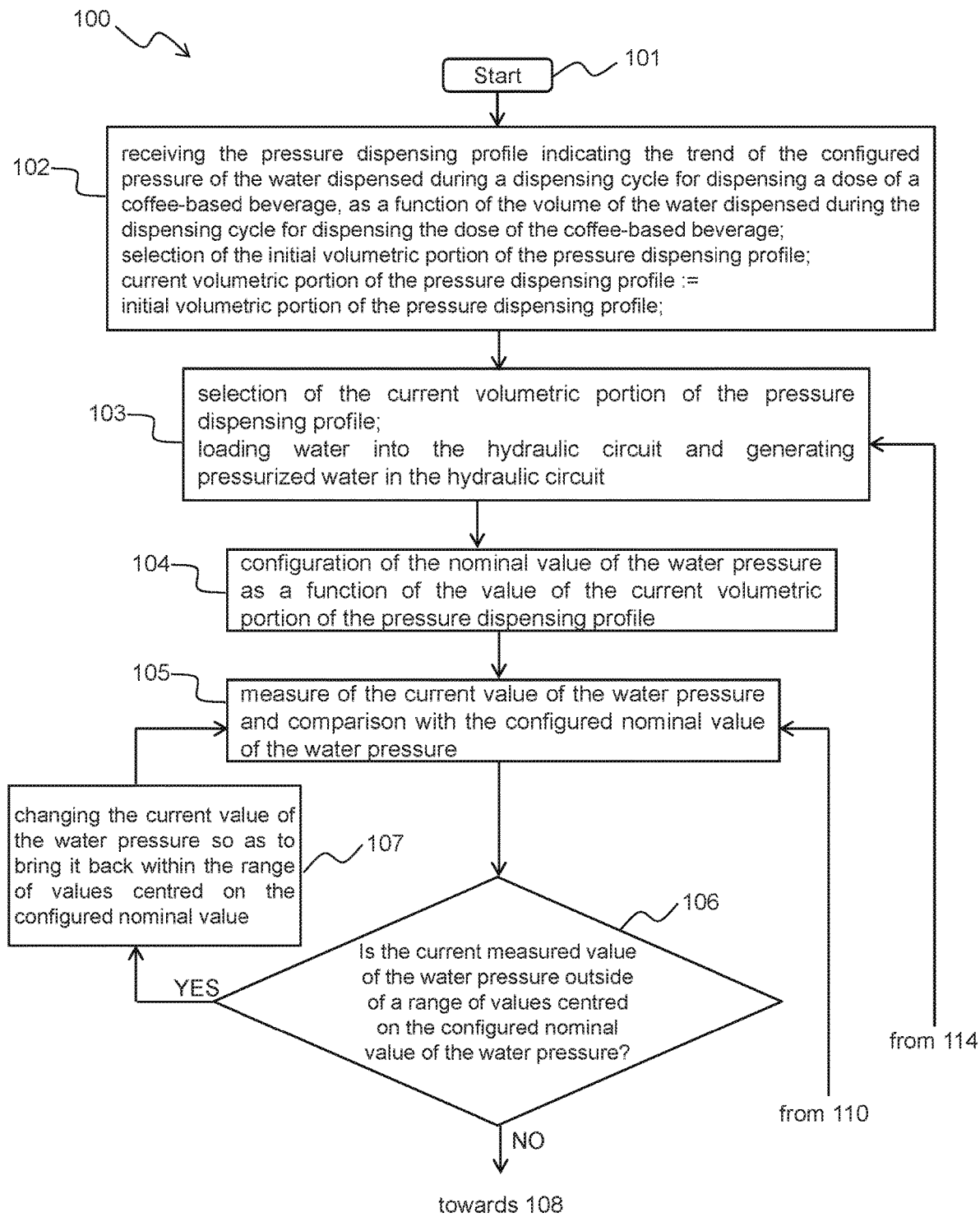
FIGS. 3A and 3B show a flow diagram of the method for dispensing coffee-based beverages performed by a processing unit inside the machine for coffee-based beverages according to the disclosure.
Figure 3B:
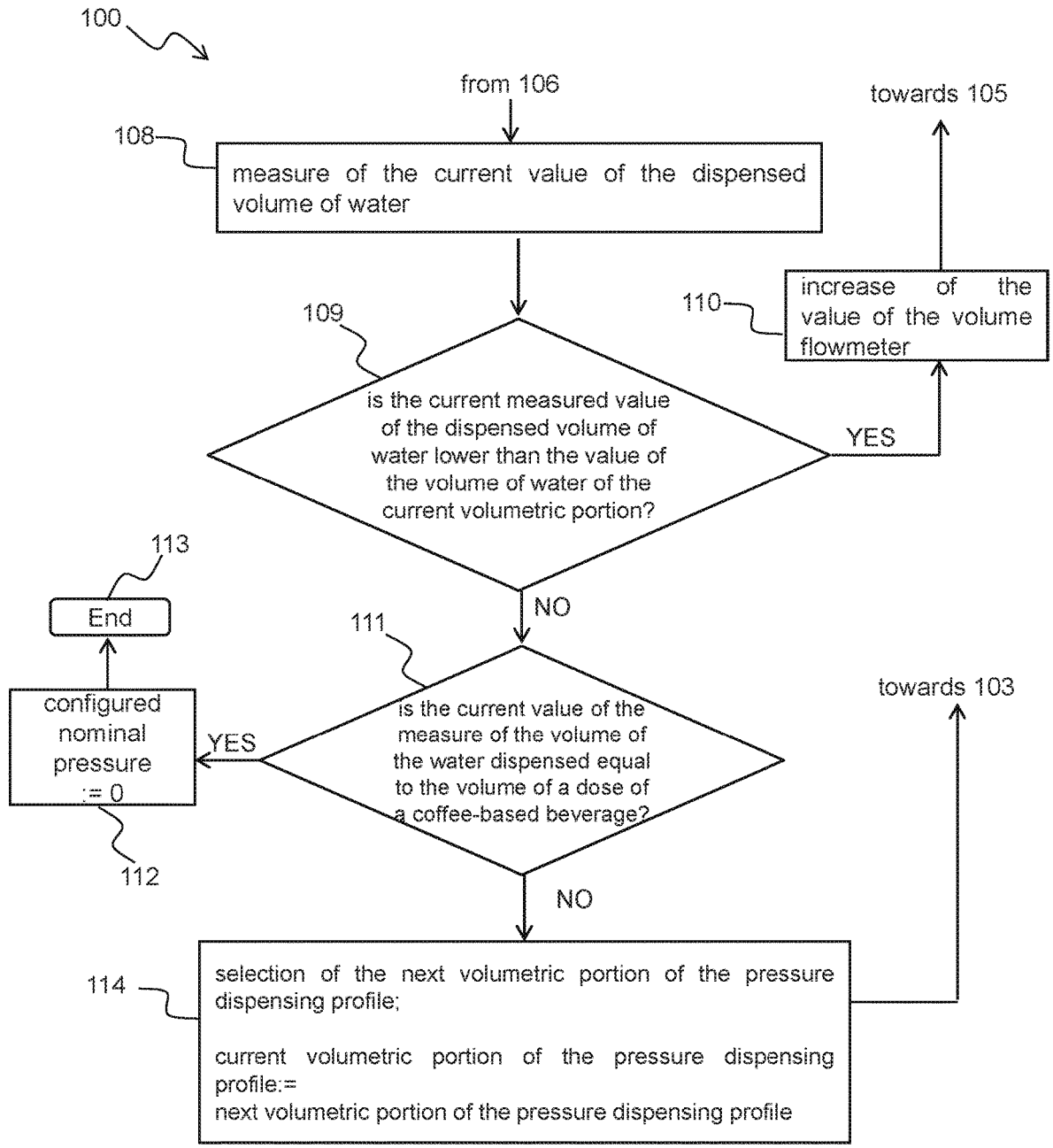

With reference to FIGS. 3A-3B, they show a flow diagram 100 of the method for dispensing coffee-based beverages executed of the processing unit 10 for automatic control of the variable pressure of the water dispensed for a dose of a coffee-based beverage.

The flow diagram 100 is composed of two cycles, of which one is external and the other is internal.

The external cycle is composed of the steps from 103 to 114, whereas the internal cycle is made up of the steps 105, 106 and 107.

The internal cycle has the function of controlling the value of the current pressure of the water so that the latter is such as to fulfill the configured pressure value.

The external cycle has the function of setting the nominal value of the water pressure as a function of the measure of the dispensed volume of water, in particular as a function of the selected volumetric portion.

The flow diagram 100 starts with step 101.

From step 101, the cycle continues to step 102 wherein it is received the pressure dispensing profile indicating the trend of the configured pressure of the pressurized water dispensed during a dispensing cycle for dispensing a dose of a coffee-based beverage, as a function of the volume of the water dispensed during the dispensing cycle for dispensing the dose of the coffee-based beverage.

In step 102 the initial volumetric portion of the pressure dispensing profile is also selected and the current volumetric portion of the pressure dispensing profile is also initialized to equal the initial volumetric portion of the pressure dispensing profile.

From step 102 the cycle proceeds to step 103 wherein the current volumetric portion of the pressure dispensing profile is selected and furthermore water is loaded into the hydraulic circuit and pressurized water is generated in the hydraulic circuit.

From step 103 the cycle proceeds to step 104 wherein it is performed the configuration of the nominal value of the water pressure as a function of the value of the current volumetric portion of the pressure dispensing profile.

From step 104 the cycle proceeds to step 105 wherein it is performed the measure of the current value of the water pressure and the comparison with respect to the configured nominal value of the water pressure.

From step 105 the cycle proceeds to step 106 wherein it is checked whether the current measured value of the water pressure is outside of a range of values centred on the configured nominal value of the water pressure:

in the negative case, the cycle proceeds to step 108;
in the positive case, the cycle proceeds to step 107.

In step 107 the current value of the water pressure is changed, so as to bring the current value of the water pressure back within the range of values centred on the configured nominal value.

From step 107 the cycle returns to step 105.

Therefore the cycle composed of steps 105, 106 and 107 is repeated until the current measured value of the water pressure is within said range of values.

In step 108 it is performed a measure of the current value of the dispensed volume of water.

From step 108, the cycle proceeds to step 109 wherein it is checked whether the current measured value of the dispensed volume of water is lower than the value of the volume of water of the current volumetric portion:

in the positive case, the cycle proceeds to step 110;
in the negative case, the cycle proceeds to step 111.

In step 110, the value of the volume flowmeter is increased and the cycle returns to step 105.

Therefore the cycle composed of steps 105, 106, 108, 109 and 110 is repeated until a quantity of water equal to the volume of water of the current selected volumetric portion has been dispensed.

In step 111 it is checked whether the current value of the measure of the volume of water dispensed is equal to the volume of a dose of the coffee-based beverage:

in the positive case, the cycle proceeds to step 112;
in the negative case, the cycle proceeds to step 114.

In step 112 the value of the configured nominal pressure is set equal to zero and the flow diagram ends (step 113).

In step 114 the next volumetric portion of the pressure dispensing profile is selected.

Moreover, in step 114 the current volumetric portion of the pressure dispensing profile is assigned equal to the next volumetric portion of the pressure dispensing profile.

From step 114 the cycle returns to step 103.

Therefore the cycle composed of steps 103, 104, 105, 106, 108, 109, 111 and 114 is repeated for each volumetric portion and ends when a quantity of water equal to the volume of a dose of the coffee-based beverage has been dispensed.

In one embodiment, in step 107 the change of the current value of the water pressure is carried out with a feedback control algorithm of a Proportional-Integral-Derivative type (commonly abbreviated as "PID algorithm").

Note that according to the flow diagram 100, it performs the check of the measure of the volume of water dispensed for a dose of a coffee-based beverage (e.g. espresso-type coffee), whereas the dispensing time for dispensing the dose of the coffee-based beverage is not checked.

Referring in particular to espresso-type coffee, it is known that the quantity of the volume of a dose of espresso coffee is equal to 25 ml: this quantity is dispensed (according to known solutions) within a nominal dispensing time equal to 25 seconds (or, in any case, within an interval of time differing at most by one or two seconds with respect to the 25 seconds).

The dispensing time for dispensing a dose of espresso coffee of a volume $V\_c$ according to the disclosure can differ significantly from the nominal dispensing time of 25 seconds, that is, it can be significantly longer than 25 seconds (for example, equal to about 30-31 seconds) or significantly shorter than 25 seconds (for example, equal to 22 seconds): this variability in the dispensing time allows to obtain espresso coffee of good quality, that is, not under-extracted or over-extracted.

The variability in the dispensing time depends of the type of coffee grind used.

It will be now described the operation of the machine 1 for coffee-based beverages according to the first embodiment of the disclosure, referring also to FIGS. 1, 2A and 3A-3B.

It is assumed that a dose of espresso coffee of a volume $V\_c=25$ ml is being prepared.

It is further assumed that the first trend 50 of the pressure dispensing profile signal $S\_pv$ in FIG. 2A is stored into the memory 16 and that the configuration signal $S\_cfg$ is a voltage signal that drives the electric motor.

At the initial time, the user presses a button on the machine 1 and it is generated the activation signal $S\_at$ having a transition from a logic low value to a logic high value, indicating the start of a dispensing cycle for dispensing a dose of espresso coffee.

The processing unit 10 receives the activation signal $S\_at$ having said transition, reads from the memory 16 that the pressure dispensing profile $S\_pv$ has the trend 50, selects the first volumetric portion 50-1 having the value P1 between the volumetric value V0 (included) and the volumetric value V1 (excluded) and assigns the current volumetric portion equal to the first volumetric portion 50-1 (steps 102 and 103).

Subsequently, the processing unit 10 generates the configuration signal $S\_cfg$ having a voltage value VG1 proportional to the value P1 in the first volumetric interval comprised between the volumetric value V0 and the volumetric value V1 (step 104).

The electric motor receives the configuration signal $S\_cfg$ having said voltage value VG1 and adjusts, as a function thereof, the rotational speed of the electric motor.

The hydraulic pump 2 is driven by the electric motor and then the hydraulic pump 2 sets, as a function of the adjusted values of the rotational speed of the electric motor, the pressure P1 of the water exiting the hydraulic pump 2, that is the pressure P1 of the water flowing in the connection line 12 is set.

During the first volumetric interval the water pressure sensor 3 measures the pressure value of the water exiting the hydraulic pump 2 and generates the pressure measurement signal S_pm indicating said measure of the water pressure value (step 105).

The processing unit 10 receives the pressure measurement signal S_pm and, as a function thereof and of the set value P1 of the water pressure, it performs a correction of the rotational speed of the electric motor (by means of a change of the value of the supply voltage of the electric motor) in case wherein the value of the water pressure measured is outside of a range of values centred on the value P1, for example P1 ±5% (steps 106 and 107).

Furthermore, during the first volumetric interval the volume flowmeter 4 measures the volume of the water flowing in the connection line 12 and it generates the volume measurement signal S_mv indicating said measure of the volume of the water (cycle composed of steps 108, 109, 110 and 105).

Subsequently, the volume flowmeter 4 measures that the volume of the water dispensed is equal to the value V1 and then it generates the volume measurement signal S_mv having said value V1 indicating the end of the first volumetric interval (step 109 and transition from step 109 to 111).

The processing unit 10 detects that the current value V1=10 ml of the measure of the volume of the water dispensed is smaller than the volume V_c=25 of a dose of espresso coffee and selects the second volumetric portion 50-2 (transition from step 111 to 114).

Moreover, the current volumetric portion is assigned equal to the second volumetric portion 50-2 comprised between V1 and V2 (step 114 and transition from step 114 to 103).

The processing unit 10 selects the current volumetric portion equal to the second volumetric portion 50-2 (step 103).

Subsequently, the processing unit 10 generates the configuration signal S_cfg having a voltage value VG2 proportional to the value P2 (step 104).

The electric motor receives the configuration signal S_cfg having said voltage value VG2 and adjusts, as a function thereof, the rotational speed of the electric motor.

The hydraulic pump 2 sets, as a function of the adjusted values of the rotational speed of the electric motor, the pressure P2 of the water exiting the hydraulic pump 2, that is the pressure P2 of the water flowing in the connection line 12 is set.

During the second volumetric interval comprised between the volumetric value V1 and the volumetric value V2, the water pressure sensor 3 measures the pressure value of the water exiting the hydraulic pump 2 and generates the pressure measurement signal S_pm indicating said measure of the water pressure value (step 105).

The processing unit 10 receives the pressure measurement signal S_pm and, as a function thereof and of the set value P2 of the water pressure, it performs a correction of the rotational speed of the electric motor (by means of a change of the value of the supply voltage of the electric motor) in case wherein the value of the water pressure measured is outside of a range of values centred on the value P2, for example P2 ±5% (steps 106 and 107).

Furthermore, during the second volumetric interval the volume flowmeter 4 measures the volume of the water flowing in the connection line 12 and it generates the volume measurement signal S_mv indicating said measure of the volume of the water (cycle composed of steps 108, 109, 110 and 105).

Subsequently, the volume flowmeter 4 measures that the volume of the water dispensed is equal to the value V2 and thus it generates the volume measurement signal S_mv having said value V2 indicating the end of the second volumetric interval (step 109 and transition from step 109 to 111).

The processing unit 10 detects that the current value V2=20 ml of the measure of the volume of the water dispensed is smaller than the volume V_c=25 ml of a dose of espresso coffee and selects the third volumetric portion 50-3 (transition from step 111 to 114).

Moreover, the current volumetric portion is assigned equal to the third volumetric portion 50-3 comprised between V2 and V_c (step 114 and transition from step 114 to 103).

The processing unit 10 selects the current volumetric portion equal to the third volumetric portion 50-3 (step 103).

Subsequently, the processing unit 10 generates the configuration signal S_cfg having voltage values VG2 proportional to the values of the third volumetric portion 50-3 (step 104).

The electric motor receives the configuration signal S_cfg having voltage values proportional to said values of the third volumetric portion 50-3 and adjusts, as a function thereof, the rotational speed of the electric motor.

The hydraulic pump 2 sets, as a function of the adjusted values of the rotational speed of the electric motor, the pressure of the water exiting the hydraulic pump 2, that is the pressure of the water flowing in the connection line 12 is set.

In the third volumetric interval comprised between the volumetric value V2 and the volume V_c of a dose of espresso coffee, the water pressure sensor 3 measures the pressure value of the water exiting the hydraulic pump 2 and generates the pressure measurement signal S_pm indicating said measure of the water pressure value (step 105).

The processing unit 10 receives the pressure measurement signal S_pm and performs, as a function thereof and of the water pressure values set according to the third volumetric portion 50-3, a correction of the rotational speed of the electric motor in case wherein the value of the measured water pressure differs significantly from the pressure value set according to the third volumetric portion 50-3 (steps 106 and 107).

Moreover, during the third volumetric interval the volume flowmeter 4 measures the volume of the water flowing in the connection line 12 and generates the volume measurement signal S_mv indicating said measure of the volume of the water (cycle composed of steps 108, 109, 110 and 105).

Subsequently, the volume flowmeter 4 measures that the volume of the water dispensed is equal to the volume V_c of a dose of espresso coffee and thus it generates the volume measurement signal S_mv having a value equal to the volume V_c of the dose of coffee (step 109 and transition from step 109 to 111).

The processing unit 10 detects that the current value of the measure of the volume of the water dispensed is equal to the value of the volume V_c=25 ml of a dose of espresso coffee and generates the configuration signal S_cfg having a null voltage value (transition from step 111 to 112).

The electric motor receives the configuration signal S_cfg having said null voltage value and adjusts the rotational speed of the electric motor equal to the null value.

The hydraulic pump 2 sets the pressure of the water exiting the hydraulic pump 2 equal to the null value, that is a null pressure of the water flowing in the connection line 12 is set.

The dispensing cycle for dispensing a dose of espresso coffee is thus ended (step 113).

The operation of the machine 1 for coffee-based beverages of the first embodiment according to the second trend 51 of the pressure dispensing profile signal S_pv in FIG. 2B differs from the operation illustrated above according to the first trend 50 of the pressure dispensing profile signal S_pv in FIG. 2A in that when the volume flowmeter 4 measures that the volume of the water is equal to the value V2, it is selected the volumetric portion 51-3 wherein the set water pressure is equal to a pressure value P3 in the volumetric interval comprised between the value V3=15 ml and the value V4=20 ml.

Therefore during the volumetric interval comprised between V3 and V4 the operation is similar to that explained above for FIG. 2A in the volumetric interval comprised between V1 and V2, with the difference that the set water pressure value is equal to P3.

Moreover, the operation of the machine 1 for coffee-based beverages in the volumetric interval comprised between the value V4 and the volume V_c of a dose of espresso coffee in FIG. 2B is similar to that explained above in the volumetric interval comprised between the value V2 and V_c in FIG. 2A.

The operation of the machine 1 for coffee-based beverages of the first embodiment according to the third trend 52 of the pressure dispensing profile signal S_pv of Figure "C is the following:
- the operation in the volumetric interval comprised between the volumetric value V0'=0 and the volumetric value V5 of FIG. 2C is similar to operation in the volumetric interval comprised between the volumetric value V0=0 and the volumetric value V1 (excluded) of FIG. 2A;
- the operation in the volumetric interval comprised between the volumetric value V5 and the volume V_c of a dose in FIG. 2C is similar to the operation in the volumetric interval comprised between the volumetric value V2 and the volume V_c of a dose in FIG. 2A.

Figure 4:
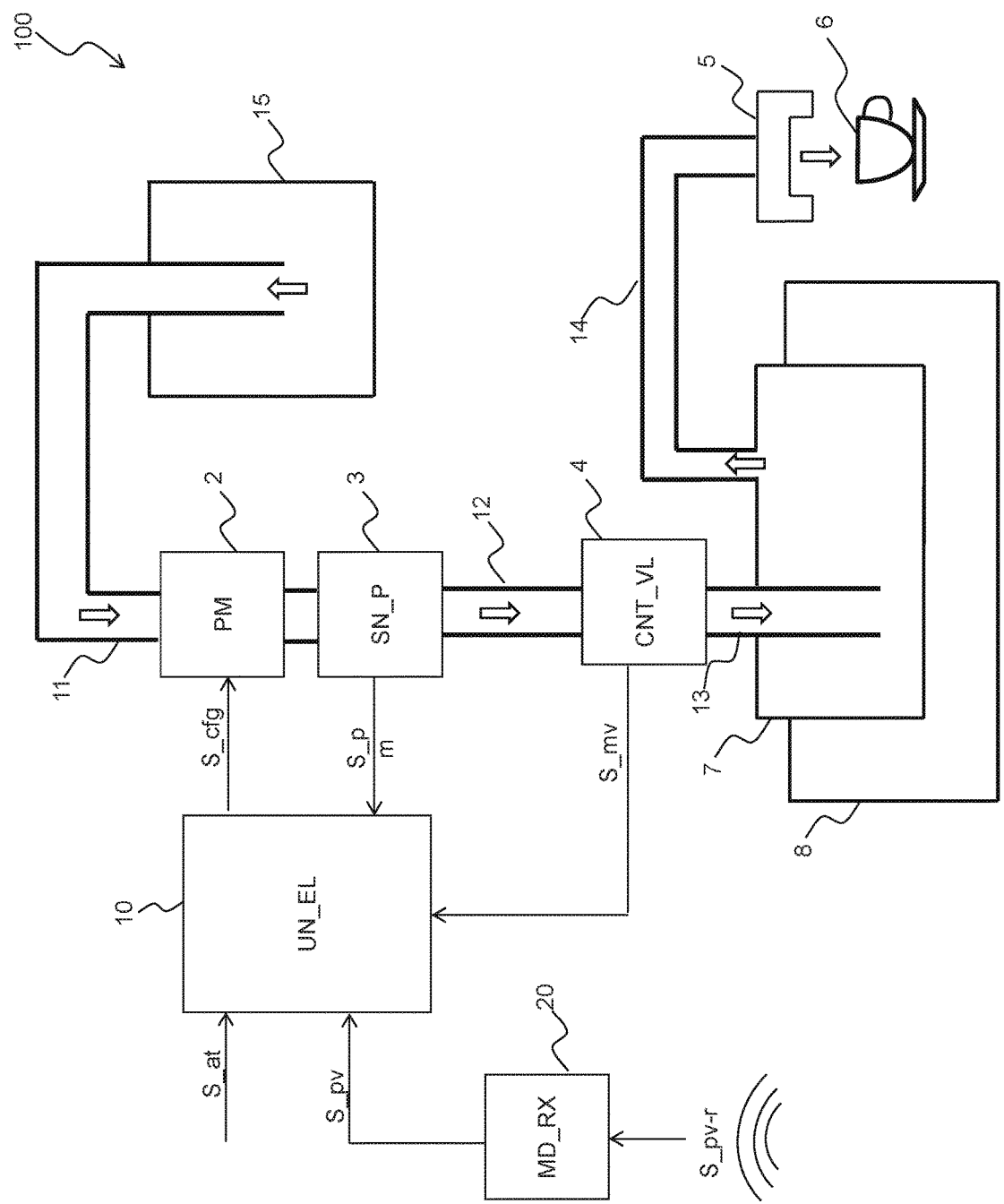
FIG. 4 shows a block diagram of a machine for coffee-based beverages according to a second embodiment of the disclosure.

With reference to FIG. 4, it is shown a block diagram of a machine 100 for coffee-based beverages according to the second embodiment of the disclosure.

The machine 100 for coffee-based beverages of the second embodiment differs from the machine 1 for coffee-based beverages of the first embodiment in that it is present a receiver-transmitter 20 of radio signals having the function of radio receiving the pressure dispensing profile radio signal S_pv-r indicating the trend of the configured pressure of the pressurized water variable as a function of the volume of the water dispensed during a dispensing cycle for dispensing a dose coffee-based beverage and having the function of forwarding the received signal to the processing unit 10 by means of the pressure dispensing profile signal S_pv.

In other words, the first trend 50 (or the second trend 51, or the third trend 52) of the configured pressure is received by the machine 100 for coffee-based beverages by means of a radio transmitted signal.

In one embodiment, the receiver-transmitter 20 is configured to operate according to Bluetooth specifications, as defined by the Bluetooth Special Interest Group association (commonly abbreviated as "SIG"), in particular according to specification version 2.0 or later.

Alternatively, the receiver-transmitter 20 is configured to operate using WiFi technology, as defined in the IEEE 802.11 standards.

Figure 5:
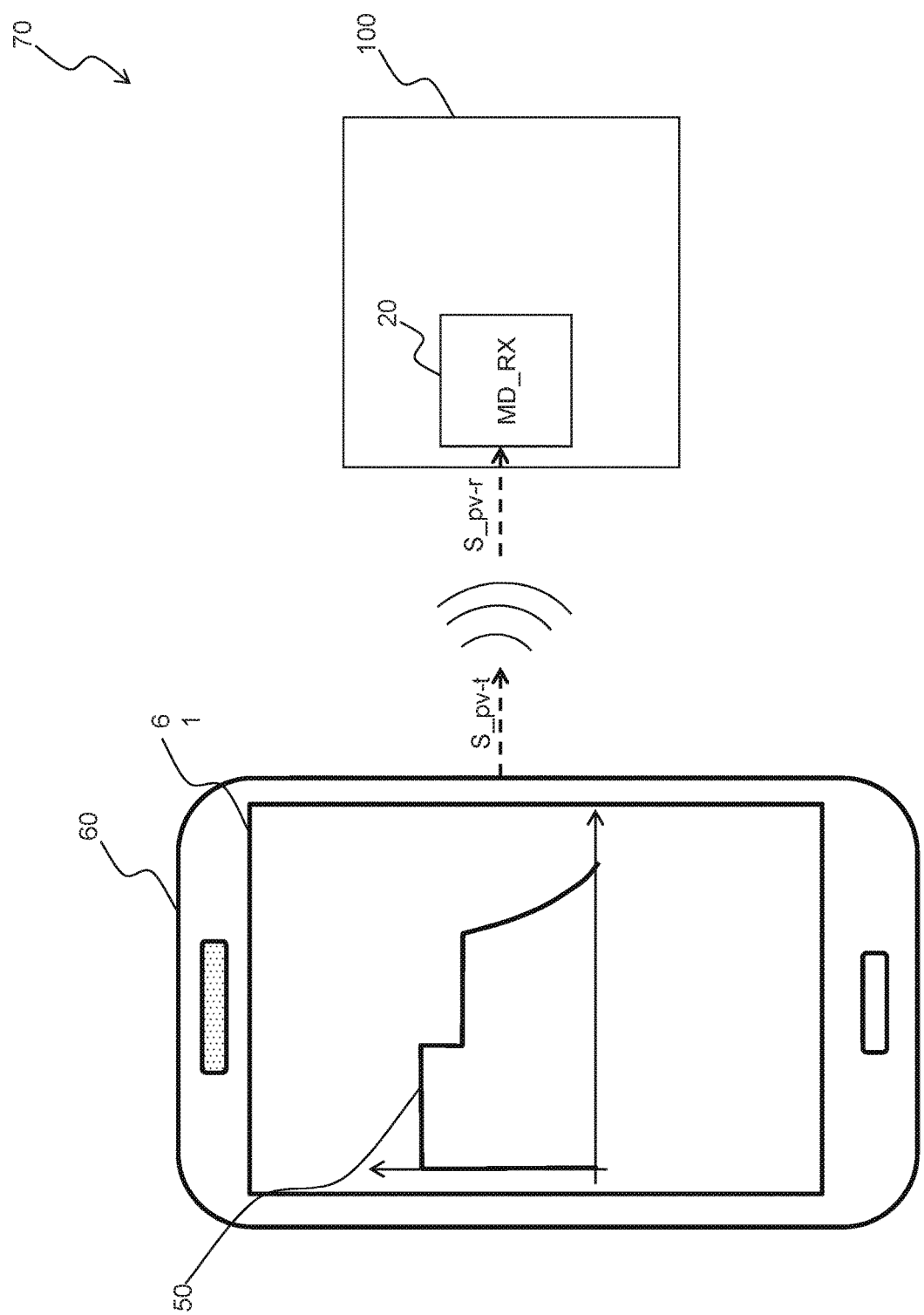
FIG. 5 schematically shows a system comprising a machine for coffee-based beverages according to the second embodiment of the disclosure and a mobile electronic device for configuring a pressure dispensing profile on the machine for coffee-based beverages.

With reference to FIG. 5, it is shown a system 70 comprising the machine 100 for coffee-based beverages of the second embodiment and a mobile electronic device 60.

For example, the mobile electronic device 60 can be a smartphone (e.g. an iPhone), a tablet (e.g., an iPad), a laptop or a tablet PC.

The mobile electronic device 60 is connected to the machine 100 for coffee-based beverages by means of a short-range radio connection, for example of a Bluetooth or WiFi type.

In particular, the mobile electronic device 60 comprises a radio signal transmitter configured to radio transmit towards the receiver-transmitter 20 of the machine 100 for coffee-based beverages a transmitted pressure dispensing profile signal S_pv-t indicating the trend of the configured pressure of the pressurized water, which is variable as a function of the volume of water dispensed during a dispensing cycle for dispensing a dose of a coffee-based beverage.

For the sake of simplicity, it is assumed that the mobile electronic device 60 is a smartphone; in this case, the smartphone 60 comprises a display 61 of the touchscreen type.

The smartphone 60 is configured to execute a software application in order to generate one or more pressure dispensing profile signals 50, 51, 52 indicating the trend of the configured pressure of the pressurized water, which is variable as a function of the volume of the water dispensed during a dispensing cycle for dispensing a dose of a coffee-based beverage.

Moreover, the software application of the smartphone is configured to display on the screen 61 a graphic interface that represents one or more pressure dispensing profile signals 50, 51, 52 indicating the trend of the configured pressure of the pressurized water, which are variable as a function of the volume of the water dispensed during a dispensing cycle for dispensing a dose of a coffee-based beverage.

For example, the screen 61 displays the first trend 50 of the pressure dispensing profile signal S_pv described above.

The software application of the smartphone allows to create and modify the first trend 50 of the pressure dispensing profile signal S_pv, for example by moving a finger on the screen 61; in particular, the volumetric values V1, V2 and also the pressure values P1, P2 can be changed.

This allows for highly flexible configuration and modification of the configured pressure trends: in this way coffee-based beverages of various types can be dispensed according to the user needs.

Moreover, the software application of the smartphone allows to configure a pressure dispensing profile signal on the machine 100 for coffee-based beverages, by means of the radio transmission of the selected dispensing profile signal to the receiver-transmitter 20 of the machine 100 for coffee-based beverages.

Similar considerations are applicable in the case of the second trend 51 and of the third trend 52, that is the software application allows to:
- create and modify the second trend 51 of the pressure dispensing profile signal S_p, in particular the volumetric values V1, V3, V4 and the pressure values P1, P2, P3.

create and modify the third trend 52 of the pressure dispensing profile signal S_p, in particular the volumetric value V5 and the pressure value P4.

According to a variant of the first or second embodiment, it is present a time interval interposed between two contiguous volumetric portions, having values comprised for example between 1 millisecond and 2 seconds, in particular between 1 millisecond and 60 milliseconds: this allows to program a pre-infusion phase minimizing the risk of overflowing water over the portafilters during the process of spray/extraction of the expresso coffee or during the process of infusion of the American filter coffee.

Referring in particular to the first embodiment, let's consider the pressure dispensing profile signal S_pv having the first trend 50 shown in FIG. 2A.

At the end of the first volumetric interval 50-1 (that is when the quantity of the volume of the dispensed water is equal to V1), it is activated the measure of a first time interval during which the processing unit 10 generates the configuration signal having a suitable value such to adjust the operation of the hydraulic pump in order to set the pressure of the water exiting the hydraulic pump 2 (and thus inside the connection line 12 and inside the entire hydraulic circuit) to a substantially constant value, for example comprised between 3 bar and 11 bar.

In particular, said substantially constant pressure value is obtained by means of closing the three-way group solenoid valve positioned along the dispensing line 14; therefore during the first time interval the group solenoid valve is closed in order to stop the water flow from the dispensing line 14 towards the dispensing unit 5 (that is, it is stopped the dispensing of the coffee-based beverage from the dispensing unit 5) and thus it is dispensed water exiting the pump 2 with a pressure having values decreasing starting from value P1.

At the end of the first time interval, the operation continues as above described for the second volumetric portion 50-2, thus the processing unit 10 generates the configuration signal S_cfg having a suitable value such to set the pressure of the water exiting the pump 2 equal to P2.

Analogously, at the end of the second volumetric interval 50-2 (that is when the quantity of the volume of the dispensed water is equal to V2), it is activated the measure of a second time interval during which the processing unit 10 generates the configuration signal having a suitable value such to adjust the operation of the hydraulic pump 2 in order to set the pressure of the water exiting the hydraulic pump 2 (and thus inside the connection line 12) to a substantially constant value; therefore during the second time interval the group solenoid valve is closed in order to stop the water flow from the dispensing line 14 towards the dispensing unit 5 (that is, it is stopped the dispensing of the coffee-based beverage from the dispensing unit 5) and thus it is dispensed water exiting the pump 2 with a pressure having values decreasing starting from value P2.

It is observed that the values of the first and second time interval can be equal each other, or they can also be different.

The above consideration relating to the time interval for the first trend 50 of the pressure dispensing profile signal S_pv are applicable analogously to the second trend 51 of the pressure dispensing profile signal S_pv shown in FIG. 2B, that is are present:

a first time interval interposed between the first volumetric portion 51-1 and the second volumetric portion 51-2;

a second time interval interposed between the second volumetric portion 51-2 and the third volumetric portion 51-3;

a third time interval interposed between the third volumetric portion 51-3 and the fourth volumetric portion 51-4.

It is observed that the values of the first, second and third time interval can be equal each other, or they can also be different.

The time interval between two contiguous volumetric portions is measured for example directly by the processing unit 10, by means of an internal counter which is activated by the program executed on the processing unit 10.

In one embodiment, the values of the time intervals between two contiguous volumetric portions is calculated by means of auto-learning.

In other words:

pressurized water is transported across the hydraulic circuit and the coffee-based beverage is dispensed from the dispensing unit 5;

when it is detected that the quantity of delivered water has filled the filter of the dispensing unit 5, the current volumetric interval terminates and it is activated the time interval during which it is set the substantially constant pressure value in the hydraulic circuit;

when it is detected that the quantity of water has been filtered, the time interval terminates and the subsequent volumetric interval is activated.

One embodiment of the present disclosure is a first method for dispensing coffee-based beverages. The first method comprises the steps of:

a) providing a pressure dispensing profile signal 50 indicating the trend of the configured pressure S_pv of the pressurized water during a cycle for dispensing a dose V_c of a coffee-based beverage, as a function of the volume of water dispensed during the dispensing cycle, wherein said dispensing profile signal comprises a first volumetric portion having a first pressure trend in a first volumetric interval and comprises a second volumetric portion having a second pressure trend n a second volumetric interval;

b) generating a configuration signal S_cfg as a function of the first pressure trend during the first volumetric interval so as to drive a hydraulic pump and generate the pressurized water;

c) receiving the volume measurement signal S_mv indicating the measure of the volume of the pressurized water at the end of the first volumetric interval and detecting that it is smaller than the volume of the dose;

d) generating the configuration signal S_cfg as a function of the second pressure trend during the second volumetric interval so as to drive the hydraulic pump and generate the pressurized water;

e) receiving the volume measurement signal indicating the measure of the volume of the water at the end of the second volumetric interval and checking whether it is equal to the dose volume V_c.

One embodiment of the present disclosure is a computer readable medium having a program recorded thereon, said computer readable medium comprising computer program code means adapted to perform the steps b)-e) of the first method, when said program is run on a computer.

One embodiment of the present disclosure is a second method for dispensing coffee-based beverages.

The second method comprises the steps of:

a) providing a pressure dispensing profile signal indicating the trend of the configured pressure S_pv of the pressurized water during a cycle for dispensing a dose V_c of a coffee-based beverage, as a function of the volume of the water dispensed during the dispensing cycle, wherein said dispensing profile signal comprises a volumetric portion having a pressure value that is substantially constant in a volumetric interval;
b) generating a configuration signal S_cfg as a function of the pressure value during the volumetric interval so as to drive a hydraulic pump and generate the pressurized water;
c) receiving a volume measurement signal S_mv indicating the measure of the volume of the water at the end of the volumetric interval and checking whether it is equal to the volume of the dose V_c;

wherein the pressure value is comprised between 0.3 bars and 0.7 bars or between 3 bar and 5 bar, and wherein the width of the volumetric interval is comprised between 100 and 200 millilitres.

One embodiment of the present disclosure is a computer readable medium having a program recorded thereon, said computer readable medium comprising computer program code means adapted to perform the steps b)-c) of the second method, when said program is run on a computer.

The invention claimed is:

1. Machine for coffee-based beverages, the machine comprising:
   a hydraulic pump adapted to generate pressurized water, as a function of values of a configuration signal;
   a hydraulic circuit adapted to transport the pressurized water;
   a volume flowmeter configured to measure a volume of the pressurized water dispensed during a dispensing cycle of a dose of a coffee-based beverage and generate a volume measurement signal indicating said measure of the volume of the pressurized water;
   a processing unit configured to:
      receive a pressure dispensing profile signal indicating a trend of the configured pressure of the pressurized water during the dispensing cycle, as a function of a volume of the water dispensed during the dispensing cycle, wherein said pressure dispensing profile signal comprises a first volumetric portion having a first pressure trend in a first volumetric interval and comprises a second volumetric portion having a second pressure trend in a second volumetric interval subsequent to the first volumetric interval, wherein the first pressure trend has a first value that is constant in the first volumetric interval of an extraction phase and the second pressure trend has a second value that is constant in the second volumetric interval of the extraction phase, wherein the second value is smaller than the first value;
      generate the configuration signal as a function of the first pressure trend during the first volumetric interval so as to drive the hydraulic pump and generate the pressurized water;
      receive the volume measurement signal indicating the measure of a volume of the pressurized water at the end of the first volumetric interval and detect that it is smaller than a volume of the dose;
      generate the configuration signal as a function of the second pressure trend during the second volumetric interval so as to drive the hydraulic pump and generate the pressurized water;
      receive the volume measurement signal indicating the measure of a volume of the water at the end of the second volumetric interval and check whether it is equal to the volume of the dose.

2. The machine according to claim 1, wherein the dispensing profile signal further comprises a third volumetric portion having a third pressure trend gradually decreasing towards a null value in a third volumetric interval, and wherein the processing unit is further configured to:
   receive the volume measurement signal indicating the measure of the volume of the pressurized water at the end of the second volumetric interval and detect that it is smaller than the volume of the dose;
   generate the configuration signal as a function of the third pressure trend during the third volumetric interval so as to drive the hydraulic pump and generate the pressurized water;
   receive the volume measurement signal indicating the measure of the volume of the water at the end of the third volumetric interval and detect that it is equal to the volume of the dose.

3. The machine according to claim 1, further comprising a water pressure sensor configured to measure the pressure value of the water dispensed during the dispensing cycle and to generate a pressure measurement signal indicating said measure of the pressure of the pressurized water,
   wherein the processing unit is further configured, during the first and/or the second volumetric portion, to:
      receive the pressure measurement signal indicating the measure of the water pressure value;
      compare the measure of the water pressure value with respect to the first pressure trend of the first volumetric portion and with respect to the second pressure trend of the second volumetric portion;
      change the value of the configuration signal, as a function of said comparison.

4. The machine according to claim 1, wherein a value of a dose of coffee is comprised between 25 and 30 millilitres, and wherein the first pressure value and the second pressure value are comprised between 7 and 10 bar.

5. The machine according to claim 1, wherein the processing unit is further configured to:
   activate, at the end of the first volumetric interval, a measure of a time interval;
   generate the configuration signal having a value to adjust the operation of the hydraulic pump so as to set a constant pressure value of the water exiting the hydraulic pump;
   at the end of the first time interval, generate the configuration signal as a function of the second pressure trend during the second volumetric interval so as to drive the hydraulic pump and generate the pressurized water.

6. The machine according to claim 1, comprising a single dispensing unit adapted to dispense both espresso coffee and American filter coffee.

7. The machine according to claim 1, further comprising a radio signal receiver configured to receive the pressure dispensing profile signal, wherein said receiver is configured to operate according to Bluetooth specifications.

8. Machine for coffee-based beverages, the machine comprising:
   a hydraulic pump adapted to generate pressurized water, as a function of values of a configuration signal;
   a hydraulic circuit adapted to transport the pressurized water;
   a volume flowmeter configured to measure a volume of the pressurized water dispensed during a dispensing cycle of a dose of a coffee-based beverage and generate a volume measurement signal indicating said measure of the volume of the pressurized water;
   a processing unit configured to:
      receive a pressure dispensing profile signal indicating a trend of the configured pressure of the pressurized water during the dispensing cycle, as a function of a volume of the water dispensed during the dispensing cycle, wherein said pressure dispensing profile signal comprises a volumetric portion having a pressure value that is constant in a volumetric interval;

generate the configuration signal as a function of the constant pressure value during said volumetric interval so as to drive the hydraulic pump and generate the pressurized water;

receive the volume measurement signal indicating the measure of the volume of the water at the end of said volumetric interval and check whether it is equal to a volume of the dose;

wherein the pressure value is comprised between 0.3 bar and 0.7 bar, and wherein a width of said volumetric interval is comprised between 100 and 200 millilitres.

9. The machine according to claim 8, wherein the dispensing profile signal comprises a further volumetric portion having a further pressure trend gradually decreasing towards a null value in a further volumetric interval, and wherein the processing unit is further configured to:

activate, at the end of the volumetric interval, a measure of a time interval;

generate the configuration signal having a value to adjust the operation of the hydraulic pump so as to set a constant pressure value of the water exiting the hydraulic pump;

at the end of the time interval, generate the configuration signal as a function of said further pressure trend gradually decreasing during the further volumetric interval so as to drive the hydraulic pump and generate the pressurized water;

receive the volume measurement signal indicating the measure of the volume of the pressurized water at the end of said further volumetric interval and detect that it is equal to the volume of the dose.

10. System to control a machine for coffee-based beverages, the system comprising:

the machine for coffee-based beverages according to claim 7;

a mobile electronic device comprising a radio signal transmitter configured to transmit the pressure dispensing profile signal.

11. The system according to claim 10, wherein the mobile electronic device is a smartphone or a tablet comprising a display of the touchscreen type configured to create, modify and display the pressure dispensing profile signal by moving a finger on the screen.

* * * * *